(12) United States Patent
Chiou et al.

(10) Patent No.: US 8,714,020 B2
(45) Date of Patent: May 6, 2014

(54) PRESSURE MEASUREMENT MEMBER

(75) Inventors: Jin-Chern Chiou, Taichung (TW);
Shih-Che Lo, Taichung (TW);
Yung-Jiun Lin, Taichung (TW);
Hsin-Hsueh Tsai, Taichung (TW)

(73) Assignee: China Medical University, Taichung (TW)

( * ) Notice: Subject to any disclaimer, the term of this patent is extended or adjusted under 35 U.S.C. 154(b) by 274 days.

(21) Appl. No.: 13/412,467

(22) Filed: Mar. 5, 2012

(65) Prior Publication Data
US 2013/0098162 A1    Apr. 25, 2013

(30) Foreign Application Priority Data

Oct. 21, 2011    (TW) .............................. 100138230 A

(51) Int. Cl.
*G01L 7/08*    (2006.01)
(52) U.S. Cl.
USPC .......................................................... 73/715
(58) Field of Classification Search
None
See application file for complete search history.

(56) References Cited

U.S. PATENT DOCUMENTS

| | | | |
|---|---|---|---|
| 7,980,144 B2 | 7/2011 | Chang | |
| 2009/0136657 A1* | 5/2009 | Slafer | 427/124 |
| 2010/0052112 A1* | 3/2010 | Rogers et al. | 257/625 |
| 2011/0108932 A1* | 5/2011 | Benzel et al. | 257/415 |
| 2011/0108936 A1* | 5/2011 | Meng et al. | 257/419 |

* cited by examiner

*Primary Examiner* — Andre Allen
(74) *Attorney, Agent, or Firm* — Muncy, Geissler, Olds & Lowe, P.C.

(57) ABSTRACT

A pressure measurement member includes an insulation bottom layer, a flexible insulation top layer and at least one spacer. The insulation bottom layer has a bottom conductive element on the surface thereof. The flexible insulation top layer has a top conductive element on the surface thereof adjacent to the insulation bottom layer and opposite to the bottom conductive element. The spacer is located between the insulation bottom layer and flexible insulation top layer to separate the insulation bottom layer and flexible insulation top layer. As different pressures could result in different impedance variations on the contact area between the top conductive element and bottom conductive element, the pressure being applied can be derived from the impedance variation. The invention can measure pressure without using piezoresistive material to reduce cost.

13 Claims, 10 Drawing Sheets

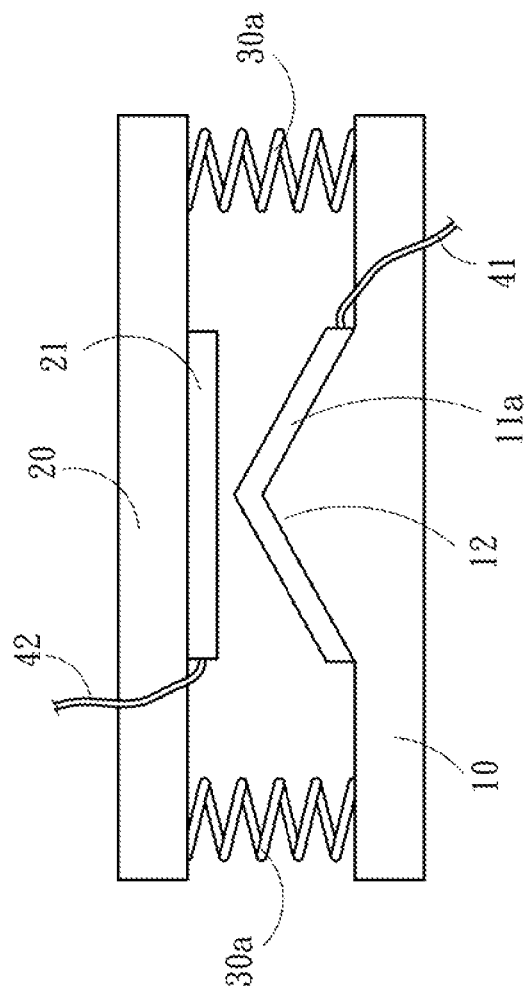

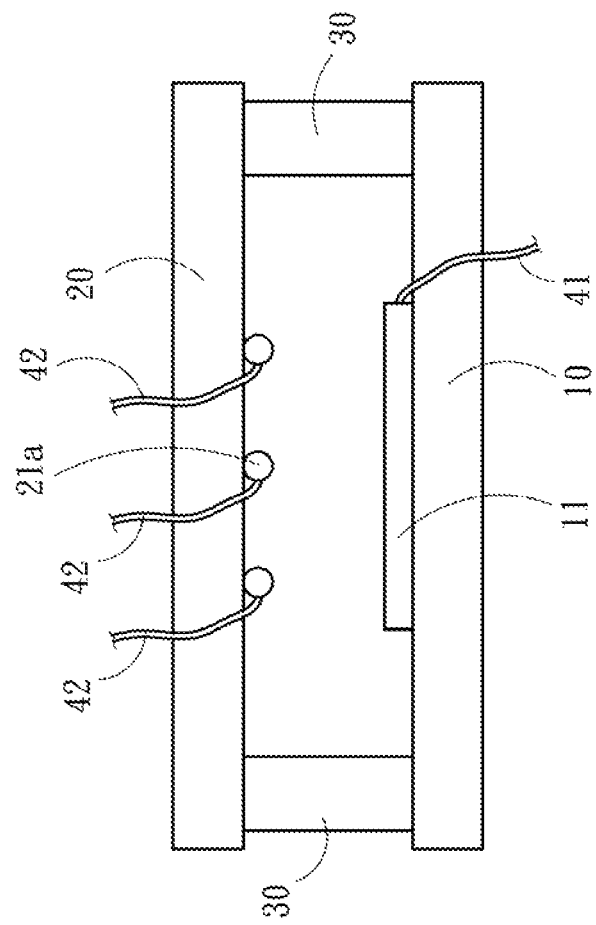

PRESSURE MEASUREMENT MEMBER

FIELD OF THE INVENTION

The present invention relates to a measurement member and particularly to a pressure measurement member.

BACKGROUND OF THE INVENTION

Piezoresistive material now has been employed to improve pressure measurement capability and sensitivity. To be applied to different surfaces, flexible electronic elements also have been developed. At present, the flexible electronic elements mostly include plastic electronic element, printed electronic element, organic electronic element and polymer electronic element and the like.

To enhance the structural reliability of flexible electronic elements, U.S. Pat. No. 7,980,144 entitled "FLEXIBLE ELECTRONICS FOR PRESSURE DEVICE AND FABRICATION METHOD THEREOF" discloses a pressure measurement structure for a flexible electronic element to prevent erroneous contact of elements located on different films. It also aims to reduce total cost of the structure. Flexible electronic material is prone to output unstable electric signals when subject to bending and could result in measurement errors. Hence there is accuracy concern on measurement results. To avoid the aforesaid problem material selection is very important. As selection of flexible electronic material applied to the pressure measurement elements is fewer, the material cost is higher.

SUMMARY OF THE INVENTION

The primary object of the present invention is to overcome the problem of conventional pressure measurement elements that has fewer material selections and higher costs.

To achieve the foregoing object, the present invention provides a pressure measurement member connecting to at least one first electric transmission line and at least one second electric transmission line. It includes an insulation bottom layer, a flexible insulation top layer and at least one spacer. The insulation bottom layer has at lease one bottom conductive element on the surface connecting electrically to the first electric transmission line. The flexible insulation top layer is opposite to the insulation bottom layer and has at least one top conductive element on the surface thereof adjacent to the insulation bottom layer to connect electrically to the second electric transmission line. The top conductive element is opposite to the bottom conductive element. The spacer is located between the insulation bottom layer and flexible insulation top layer without contacting the bottom conductive element and top conductive element, thereby separates the insulation bottom layer and flexible insulation top layer. As different pressures could affect contact area between the top conductive element and bottom conductive element, the impedance between the top conductive element and bottom conductive element is in inverse proportion to the contact area. Through the impedance variation, the applied pressure can be derived. The pressure measurement member of the invention mentioned above can be an analog sensor to obtain pressure location and amount via impedance variation formed on the contact area.

In addition, the invention further provides a digital pressure measurement member that includes an insulation bottom layer, a flexible insulation top layer and at least one spacer. The insulation bottom layer has a bottom conductive element on the surface thereof. The flexible insulation top layer is opposite to the insulation bottom layer and has a plurality of top conductive elements on the surface thereof adjacent to the insulation bottom layer. The top conductive elements are opposite to the bottom conductive element. The spacer is located between the insulation bottom layer and flexible insulation top layer to form separation between them.

By means of the structures set forth above, compared with the conventional techniques, the invention provides features as follows:

1. In the analog pressure measurement member, through the impedance variation formed on the contact area between the top conductive element and bottom conductive element, the amount of pressure can be determined.

2. In the digital pressure measurement member, multiple top conductive elements are in contact with the bottom conductive elements upon receiving downward pressure. Through the number of the contacted top conductive elements, the amount of pressure also can be derived.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2A is a schematic view of the structure of a second embodiment of the invention.

FIG. 4A is a schematic view of the structure of a fourth embodiment of the invention.

DETAILED DESCRIPTION OF THE PREFERRED EMBODIMENTS

Figure 1A:
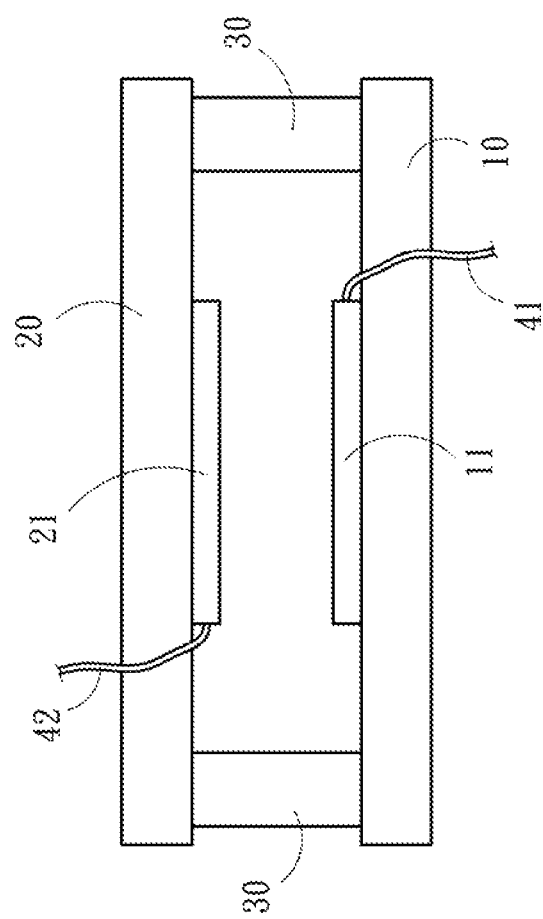
FIG. 1A is a schematic view of the structure of a first embodiment of the invention.
Figure 1B:
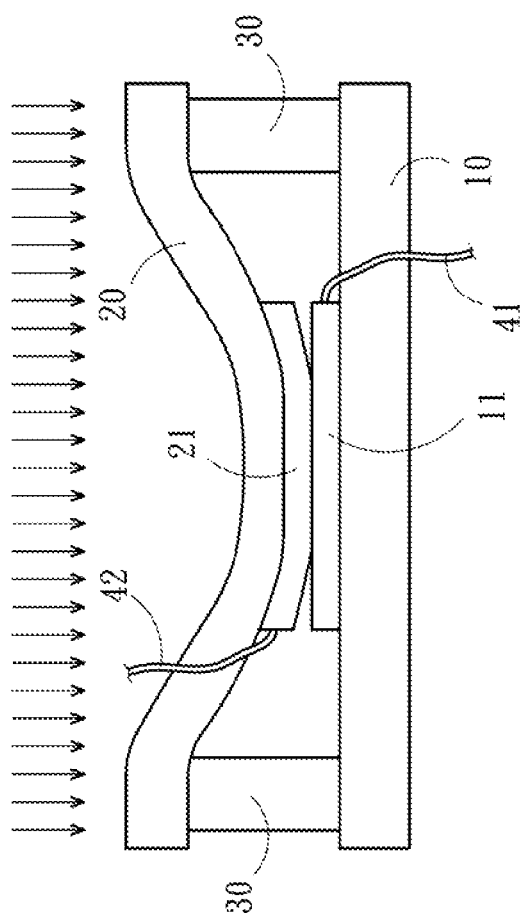
FIG. 1B is a schematic view of the first embodiment of the invention in an operating condition.

Please refer to FIGS. 1A and 1B for a first embodiment of the pressure measurement member of the invention. It is an analog device in this embodiment and connected to a first electric transmission line 41 and a second electric transmission line 42, and includes an insulation bottom layer 10, a flexible insulation top layer 20 and at least one spacer 30. The insulation bottom layer 10 has a bottom conductive element 11 on the surface connecting electrically to the first electric transmission line 41. The flexible insulation top layer 20 is opposite to the insulation bottom layer 10 and has a top conductive element 21 on the surface thereof adjacent to the insulation bottom layer 10 to connect electrically to the second electric transmission line 42. The top conductive element 21 is opposite to the bottom conductive element 11. The spacer 30 is located between the insulation bottom layer 10 and flexible insulation top layer 20 without contacting the bottom conductive element 11 and top conductive element 21, thereby separates the insulation bottom layer 10 and flexible insulation top layer 20. Different pressures affect contact area of the top conductive element 21 and bottom conductive element 11. Referring to FIG. 1B, when a downward pressure is applied, the impedance between the top conductive element 21 and bottom conductive element 11 is in inverse proportion to the contact area. Through the impedance variation, the applied pressure is derived. In this embodiment, the flexibility of the flexible insulation top layer 20 is greater than that of the top conductive element 21, hence the material cost of the top conductive element 21 can be reduced. For instance, the top conductive element 21 can be made of conductive ink, conductive polymer, indium tin oxide (ITO), anisotropic conductive film (ACF) or combinations thereof.

Figure 2B:
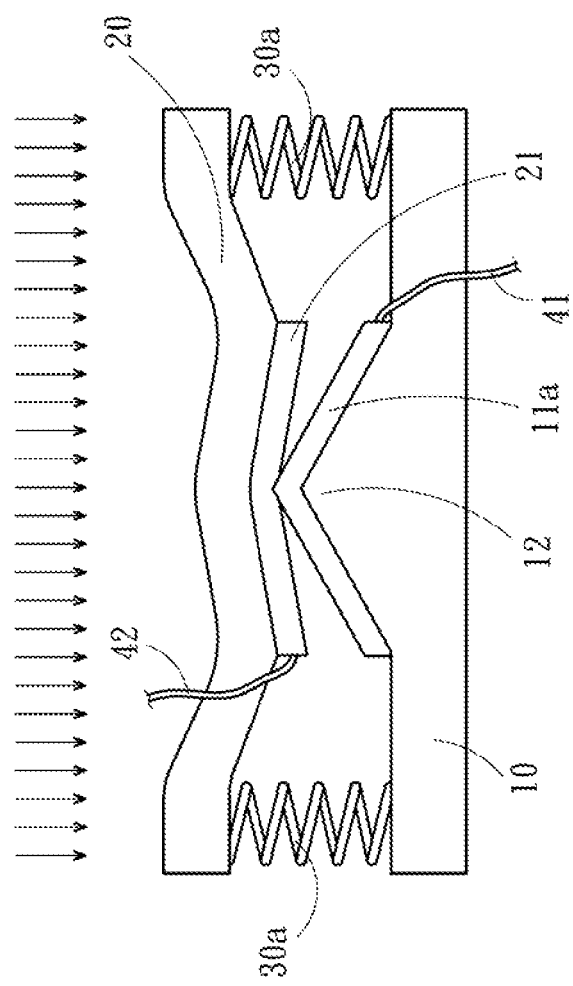
FIG. 2B is a schematic view of the second embodiment of the invention in an operating condition.
Figure 2C:
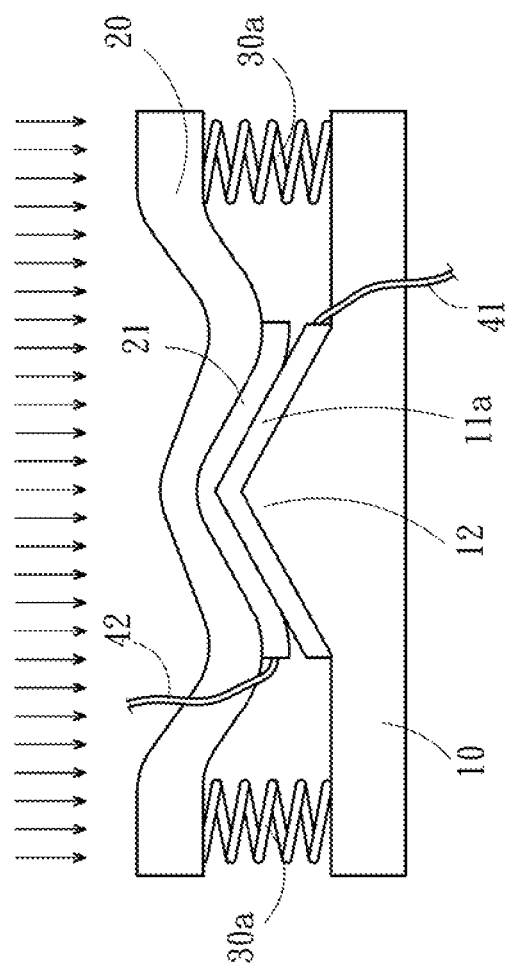
FIG. 2C is a schematic view of the second embodiment of the invention in another operating condition.

Please refer to FIGS. 2A through 2C for a second embodiment of the invention. The insulation bottom layer 10 has a protrusive portion 12 located on one side of the bottom conductive element 11a remote from the flexible insulation top layer 20. The bottom conductive element 11a is attached to the protrusive portion 12 to conform with the shape of the protrusive portion. In this embodiment, the spacer 30a is made of elastic material. The protrusive portion 12 is formed in a triangle with a vertex facing the flexible insulation top layer 20. Referring to FIG. 2B, when a downward pressure is applied, the top conductive element 21 is first in contact with the bottom conductive element 11a at the vertex of the triangle with a smaller contact area, thus the measured impedance is higher; referring to FIG. 2C, when the applied pressure is greater, the top conductive element 21 is in contact with the bottom conductive element 11a with a greater area, thus the measured impedance is smaller and can serve as the judgment criterion of the pressure measurement member.

Figure 3:
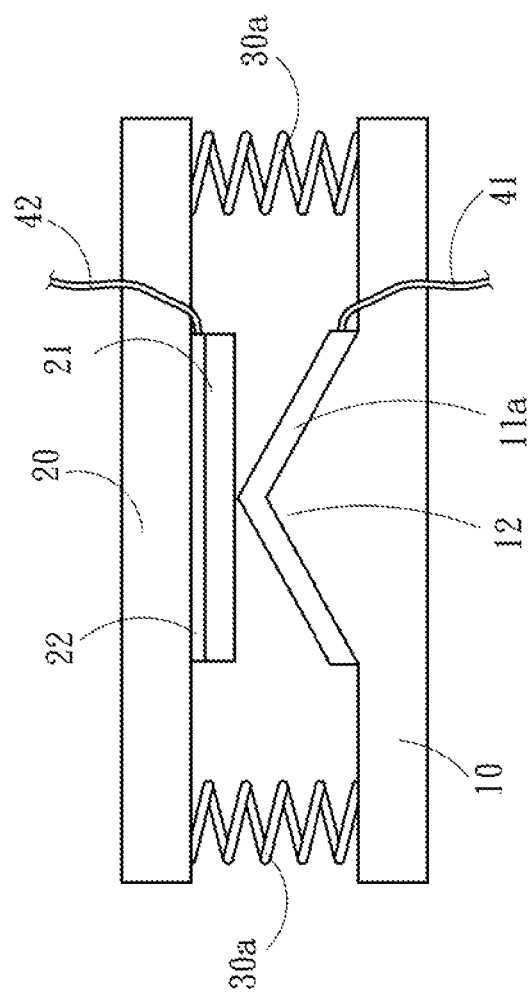
FIG. 3 is a schematic view of the structure of a third embodiment of the invention.

Please refer to FIG. 3 for a third embodiment of the invention. The flexible insulation top layer 20 further has a high conductive element 22 located between the flexible insulation top layer 20 and top conductive element 21. The second electric transmission line 42 is electrically connected to the top conductive element 21 via the high conductive element 22. The top conductive element 21 has impedance greater than that of the high conductive element 22. More specifically, the impedance of the top conductive element 21 is more ten times than that of the high conductive element 22. As the top conductive element 21 has higher impedance, the contact area with the bottom conductive element 11 greatly impacts the impedance performance. Namely, when the impedance of the top conductive element 21 is greater, the greater the contact area it is formed with the bottom conductive element 11 the smaller the total impedance becomes. By contrast, when the contact area between the top conductive element 21 and bottom conductive element 11 is smaller total impedance is greater. If the top conductive element 21 is directly connected to the second electric transmission line 42, because of the greater impedance of the material at varying locations of the top conductive element 21 different voltage surfaces are formed. Through the high conductive element 22, the voltage of the first electric transmission line 41 can be evenly distributed thereon, and any position of the top conductive element 21 in contact with the high conductive element 22 may have the same voltage, thus can reduce errors caused by uneven voltage.

It is to be noted, aside from disposing the high conductive element 22 between the top conductive element 21 and flexible insulation top layer 20, the high conductive element 22 can also be disposed between the bottom conductive element 11 and insulation bottom layer 10. Preferably, two high conductive elements 22 are provided respectively between the bottom conductive element 11 and insulation bottom layer 10, and between the top conductive element 21 and flexible insulation top layer 20 so that any location on the surface of the bottom conductive element 11 and top conductive element 21 has the same voltage to avoid voltage drop caused by the impedance.

Figure 4B:
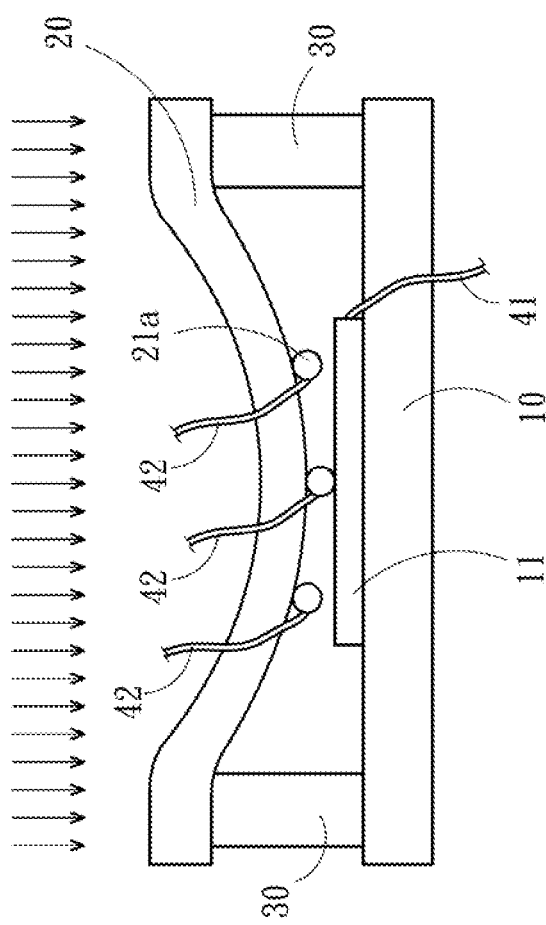
FIG. 4B is a schematic view of the fourth embodiment of the invention in an operating condition.
Figure 4C:
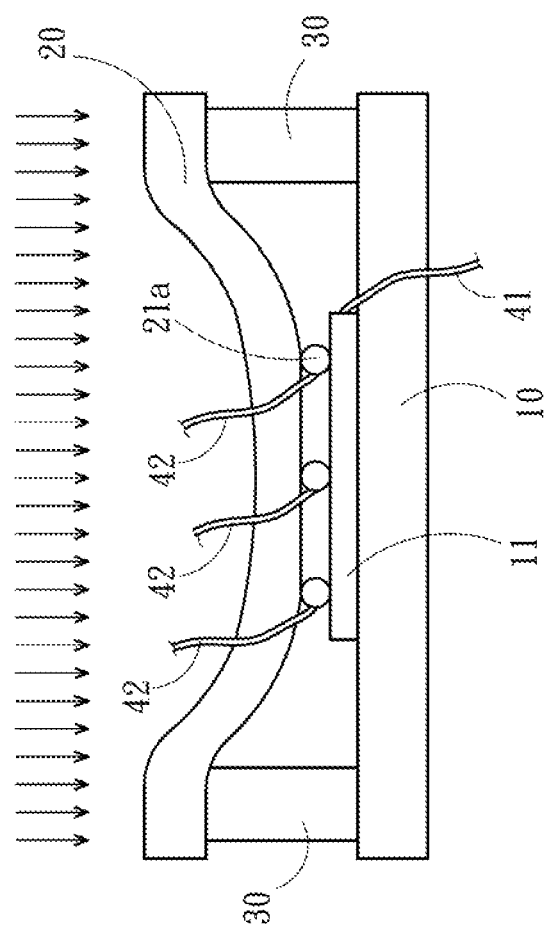
FIG. 4C is a schematic view of the fourth embodiment of the invention in another operating condition.

Please refer to FIGS. 4A through 4C for a fourth embodiment of the invention. It is a digital pressure measurement member. It includes an insulation bottom layer 10, a flexible insulation top layer 20 and at least one spacer 30. The insulation bottom layer 10 has a bottom conductive element 11 on the surface thereof. The flexible insulation top layer 20 is opposite to the insulation bottom layer 10 and has a plurality of top conductive elements 21a on the surface thereof adjacent to the insulation bottom layer 10 and opposite to the bottom conductive element 11. The spacers 30 are located between the insulation bottom layer 10 and flexible insulation top layer 20 for separation. Referring to FIG. 4B, when a downward pressure is applied, those top conductive elements 21a being moved deeper connect to the bottom conductive element 11 first and become conductive. With increasing of the pressure, referring to FIG. 4C, more top conductive elements 21a connect to the bottom conductive element 11 to become conductive. By detecting the number of the top conductive elements 21a that are conductive the size of pressurized area and amount of pressure can be derived.

Figure 5:
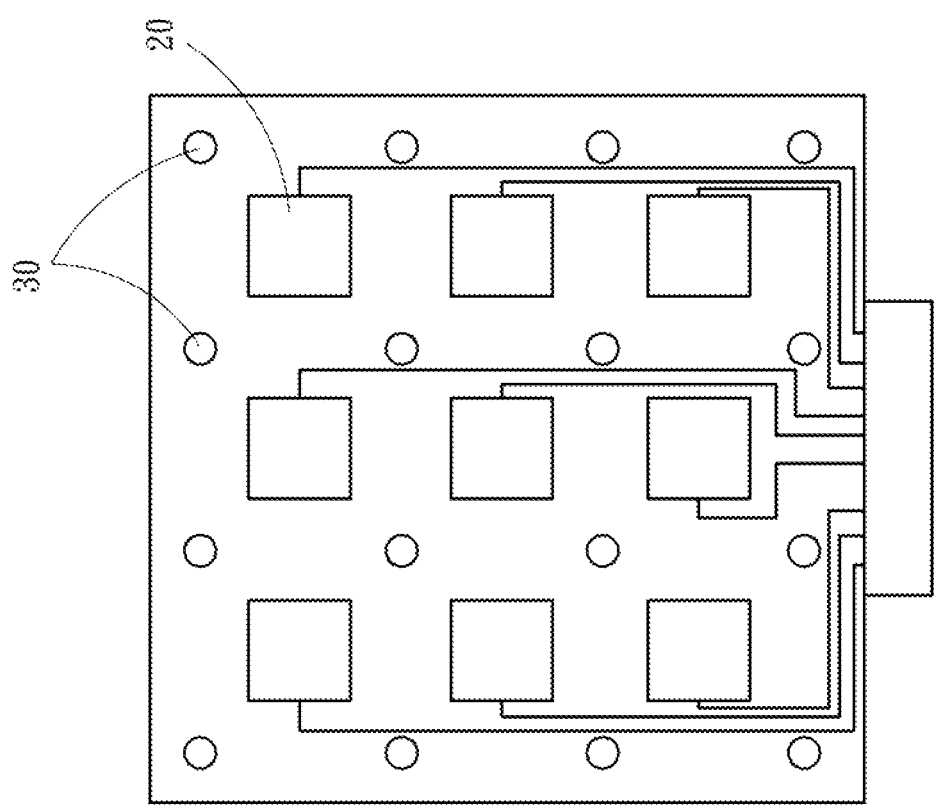
FIG. 5 is a top view of a matrix arrangement according to an embodiment of the invention.

Also referring to FIGS. 5 and 1, no matter the pressure measurement member is analog type or digital type, multiple sets of the bottom conductive elements 11 and top conductive elements 21 are provided, and multiple insulation bottom layers 10 are also provided to correspond to the bottom conductive elements 11, and multiple spacers 30 are further provided at the surrounding to balance the pressure. The bottom conductive elements 11 and top conductive elements 21 are arranged correspondingly to each other to form a matrix structure to increase pressure measurement scope.

As a conclusion, in the analog pressure measurement member, through the impedance variation on the contact area between the top conductive element and the bottom conductive element, the amount of pressure can be determined. In the digital pressure measurement member, by providing multiple top conductive elements, the amount of pressure also can be derived from the number that the top conductive elements are in contact with the bottom conductive elements when the pressure is applied. By means of the structures of the invention set forth above, there is no need to use the highly sensitive flexible piezoresistive material, hence material cost can be reduced. Moreover, by separating the elastic material and conductive material, more selecting options can be offered to meet different requirements. It provides significant improvements over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A pressure measurement member connecting to at least one first electric transmission line and at least one second electric transmission line, comprising:
   an insulation bottom layer including at least one bottom conductive element on a surface thereof to form electric connection with the first electric transmission line;
   a flexible insulation top layer which is located at one side of the insulation bottom layer and includes at least one top conductive element on a surface thereof adjacent to the insulation bottom layer and opposite to the bottom conductive element; and at least one spacer located between the insulation bottom layer and the flexible insulation top layer without contacting the bottom conductive element and the top conductive element.

2. The pressure measurement member of claim 1, wherein the flexible insulation top layer has flexibility greater than that of the top conductive element.

3. The pressure measurement member of claim 1, wherein the insulation bottom layer includes a protrusive portion, the bottom conductive element being attached to a surface of the protrusive portion to conform with the shape of the protrusive portion.

4. The pressure measurement member of claim 3, wherein the protrusive portion is formed in a triangle with a vertex facing the flexible insulation top layer.

5. The pressure measurement member of claim 1, wherein the top conductive element includes multiple sets and the second electric transmission line also includes multiple sets independently corresponding to the top conductive element.

6. The pressure measurement member of claim 1, wherein the spacer is made of elastic material, the top conductive element being made of material selected from the group consisting of conductive ink, conductive polymer, indium tin oxide and anisotropic conductive film.

7. The pressure measurement member of claim 1, wherein the top conductive element and the flexible insulation top layer are interposed by a high conductive element, the second electric transmission line electrically connecting with the top conductive element through the high conductive element, the top conductive element having impedance greater than that of the high conductive element.

8. The pressure measurement member of claim 7, wherein the impedance of the top conductive element is more ten times than that of the high conductive element.

9. The pressure measurement member of claim 1, wherein the bottom conductive element and the insulation bottom layer are interposed by a high conductive element, the first electric transmission line electrically connecting with the bottom conductive element through the high conductive element, the bottom conductive element having impedance greater than that of the high conductive element.

10. The pressure measurement member of claim 9, wherein the impedance of the bottom conductive element is more ten times than that of the high conductive element.

11. The pressure measurement member of claim 1 further including two high conductive elements located respectively between the bottom conductive element and the insulation bottom layer and between the top conductive element and the flexible insulation top layer, the first electric transmission line and the second electric transmission line electrically connecting with the bottom conductive element and the top conductive element through the two high conductive elements respectively, the top conducive element and the bottom conductive element having impedances greater than that of the high conductive elements.

12. The pressure measurement member of claim 11, wherein the impedance of the bottom conductive element is more ten times than that of the high conductive elements, and the impedance of the top conductive element is also more ten times than that of the high conductive elements.

13. The pressure measurement member of claim 1, wherein the bottom conductive element and the top conductive element respectively include multiple sets arranged correspondingly to each other to form a matrix structure.

* * * * *